(12) United States Patent
Lehmann

(10) Patent No.: US 11,684,966 B2
(45) Date of Patent: Jun. 27, 2023

(54) DEVICE FOR PRODUCING A REINFORCEMENT

(71) Applicant: MBK Maschinenbau GmbH, Kisslegg (DE)

(72) Inventor: Jens Lehmann, Aulendorf (DE)

(73) Assignee: MBK Maschinenbau GmbH, Kisslegg (DE)

( * ) Notice: Subject to any disclaimer, the term of this patent is extended or adjusted under 35 U.S.C. 154(b) by 0 days.

(21) Appl. No.: 16/953,737

(22) Filed: Nov. 20, 2020

(65) Prior Publication Data

US 2021/0078067 A1 Mar. 18, 2021

Related U.S. Application Data

(63) Continuation of application No. PCT/EP2019/064418, filed on Jun. 4, 2019.

(30) Foreign Application Priority Data

Jun. 5, 2018 (DE) ..................... 10 2018 113 294.8

(51) Int. Cl.
*B21F 15/06* (2006.01)
*B21F 27/12* (2006.01)
*B23K 11/00* (2006.01)

(52) U.S. Cl.
CPC ............ *B21F 15/06* (2013.01); *B21F 27/124* (2013.01); *B23K 11/008* (2013.01)

(58) Field of Classification Search
CPC .......... B21F 15/02; B21F 15/06; B21F 15/08; B21F 27/124; B21F 27/10; B21F 27/08; B23K 11/008
See application file for complete search history.

(56) References Cited

U.S. PATENT DOCUMENTS

| 3,726,461 | A | * | 4/1973 | Fukushima | ........... E04C 5/0618 228/115 |
| 3,749,140 | A | * | 7/1973 | Debry | ..................... B21F 27/20 219/56 |
| 5,665,254 | A | * | 9/1997 | Isono | .................... B21F 27/124 140/112 |

(Continued)

FOREIGN PATENT DOCUMENTS

| AT | 363 765 B | 8/1981 |
| EP | 2 196271 A2 | 6/2010 |
| EP | 2 498 930 B1 | 9/2012 |

(Continued)

OTHER PUBLICATIONS

German Search Report (Application No. 10 2018 113 294.8) dated Mar. 2, 2019.

(Continued)

*Primary Examiner* — Teresa M Ekiert
(74) *Attorney, Agent, or Firm* — Burr Patent Law, PLLC

(57) ABSTRACT

A device for producing a reinforcement, wherein the device has positioning mechanisms for the automated positioning of a longitudinal wire and a cross wire of the reinforcement to be produced. The device is characterized in that the device has a binding unit, wherein the device is designed to automatically connect the positioned wires by way of a binding element at a binding point by means of the binding unit.

16 Claims, 5 Drawing Sheets

(56) References Cited

U.S. PATENT DOCUMENTS 9,199,298 B2    12/2015   Bernardinis et al.
10,604,932 B2    3/2020   Von Allmen

FOREIGN PATENT DOCUMENTS

| EP | 3 209 836 B1 | 9/2018 |
|---|---|---|
| RU | 1 803 23 8 A1 | 3/1993 |
| RU | 2 028 858 C1 | 2/1995 |
| SU | 799881 A1 | 1/1981 |
| SU | 1 297 977 A1 | 3/1987 |
| WO | 99/15286 A1 | 4/1999 |
| WO | 2016/063221 A1 | 4/2016 |
| WO | 2016/202545 A1 | 12/2016 |

OTHER PUBLICATIONS

English translation of the International Preliminary Report on Patentability (Chapter I) (Application No. PCT/EP2019/064418) dated Dec. 8, 2020.
International Search Report and Written Opinion (Application No. PCT/EP2019/064418) dated Oct. 7, 2019.
Chinese Office Action (with English translation) dated Jul. 5, 2022 (Application No. 201980037574.7).
Russian Search Report (with German translation), Russian Application No. 2020143298, dated Sep. 21, 2022 (6 pages).

\* cited by examiner

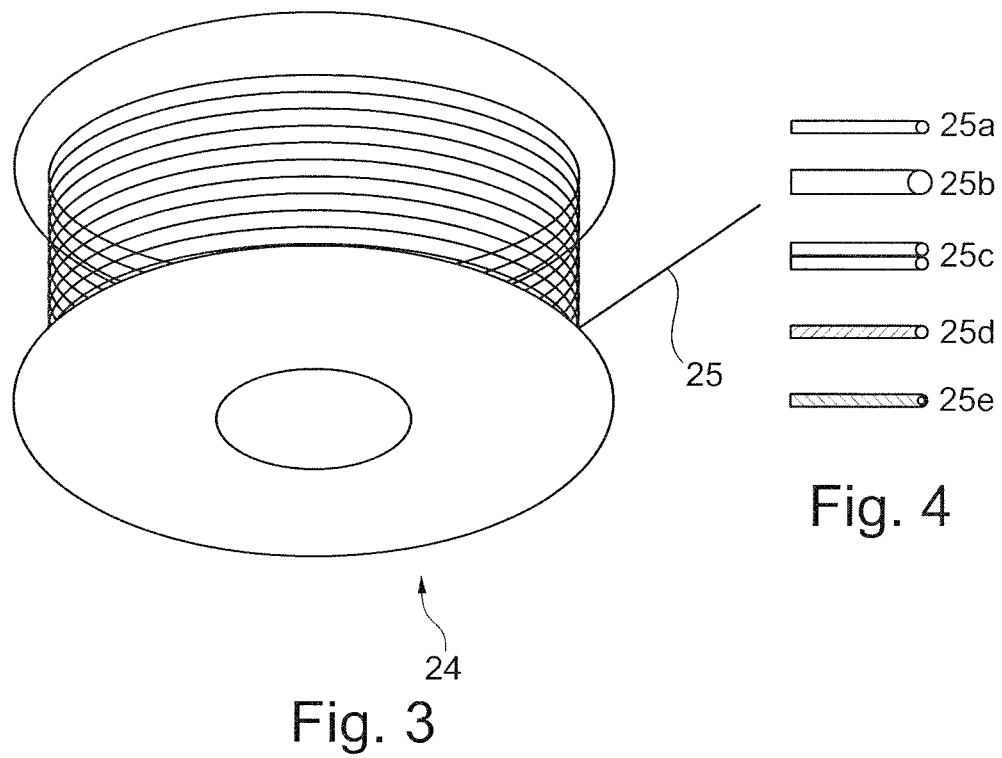
Fig. 3
Fig. 4
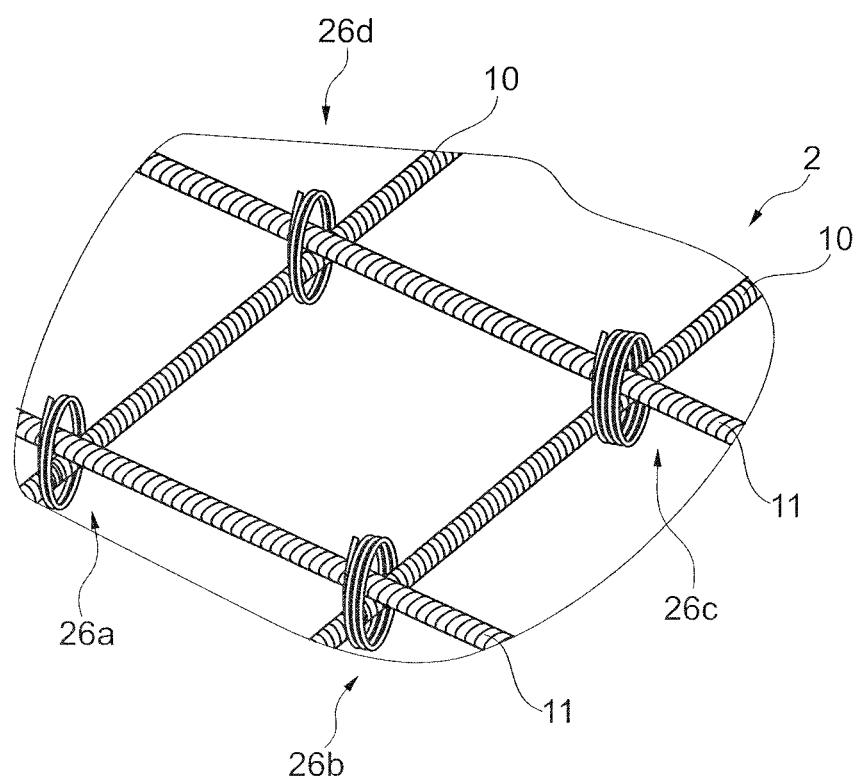
Fig. 5

DEVICE FOR PRODUCING A REINFORCEMENT

CROSS REFERENCE TO RELATED APPLICATIONS

This application is a continuation of International Application No. PCT/EP2019/064418 filed Jun. 4, 2019, which designated the United States, and claims the benefit under 35 USC § 119(a)-(d) of German Application No. 10 2018 113 294.8 filed Jun. 5, 2018, the entireties of which are incorporated herein by reference.

FIELD OF THE INVENTION

The present invention relates to a device for producing a reinforcement.

BACKGROUND OF THE INVENTION

Devices for producing a reinforcement of the type designated at the outset are already known. A known device is designed as a cage welding machine for the creation of a reinforcing body, for example.

The cage welding machine is designed, for example, for the production of a reinforcing body, e.g. for a concrete pipe or a support, wherein the cage welding machine welds a winding wire, which extends helically around longitudinal wires of the reinforcing body, at a point of intersection of the winding wire and of a longitudinal wire by means of a welding method. To weld the winding wire to the longitudinal wire, the known cage welding machine comprises a resistance welding system, thereby achieving comparatively short cycle times.

The disadvantage of this is that material of the winding wire is lost at the joining location or welding location owing to the resistance welding of the winding wire to the longitudinal wire, thereby weakening the stability of the reinforcing body at this point. Moreover, reinforcements or, in particular, reinforcing bodies which have welded longitudinal and winding wires, in particular exclusively such wires, are not suitable in earthquake zones or for use at sea, for example.

SUMMARY OF THE INVENTION

It is the object of the present invention to provide an improved device for producing a reinforcement, in particular, to expand the area of application of the device for producing a reinforcement.

The present invention starts from a device for producing a reinforcement, wherein the device has a positioning mechanism for the automated positioning of a longitudinal wire and a cross wire of the reinforcement to be produced. The positioning mechanisms are designed in such a way, for example, that a longitudinal wire and a cross wire can be positioned relative to one another in a partially automated or fully automated manner. It is advantageously possible for one longitudinal wire and one cross wire to be positioned in temporal succession or, alternatively, simultaneously, in particular relative to one another, by means of the positioning mechanisms.

The device is advantageously designed for the production of a reinforcing body of the reinforcement, wherein the reinforcing body has a plurality of longitudinal wires, in particular longitudinal rods, and a cross wire, in particular a winding wire, e.g. a single winding wire, wherein the longitudinal rods can be connected to the winding wire by the device. It is also conceivable for two, three or more winding wires to be provided on the reinforcing body.

The device is preferably designed to define a central longitudinal axis along which the longitudinal rods can be moved in a conveying direction during the production of the reinforcing body. The longitudinal rods are advantageously moved, in particular rotated, in particular simultaneously, around the central longitudinal axis by the device during production. The longitudinal rods advantageously define a length of the reinforcing body. The device is advantageously designed in such a way that the device advantageously moves and/or rotates the longitudinal rods, in particular all the longitudinal rods, with the same acceleration and/or the same speed.

For example, the device comprises a stand which is designed to define a distance, in particular a radial distance, of a longitudinal wire from the longitudinal axis. It is furthermore conceivable that the stand is designed so that a distance, in particular a radial distance, of a longitudinal wire from the longitudinal axis is variable, in particular, during a production process of the reinforcing body. For example, the stand is designed to make it possible to produce a reinforcing body which has longitudinal rods that are at different distances, in particular radial distances, from the longitudinal axis of the reinforcing body. It is thereby possible, for example, to produce a reinforcing body with an oval cross section. It is also conceivable for the device, in particular the stand, to be designed to make it possible to produce a reinforcing body that has different cross sections along its longitudinal axis. For example, a radial distance of a longitudinal wire from the longitudinal axis differs from another radial distance of the same longitudinal wire from the longitudinal axis along the longitudinal axis of the reinforcing body.

The winding wire of the reinforcing body is, for example, wound around the longitudinal rods, in particular, in a spiral shape. For example, the device is designed to wind the winding wire around the rods. It is also conceivable for the device to be designed to arrange the winding wire on the reinforcing body in a plane transverse, in particular perpendicular, to the longitudinal extent of the reinforcing body. For example, the device is designed to arrange the winding wire in a circular shape on the reinforcing body.

The reinforcing body is designed, for example, as a reinforcement for a pipe, a post, a prop and/or a pillar. The reinforcing body is of rectangular, square, multi-angled or polygonal, round and/or oval design in a cross section, in particular, as viewed transversely to a longitudinal extent of a rod, for example. By means of the device, it is advantageously possible to produce reinforcing bodies in the form of a reinforcing cage or of a reinforcing mat.

A longitudinal rod or rod, in particular each longitudinal rod, advantageously has a larger diameter than the wire, e.g. the cross wire or the winding wire. It is also conceivable for the diameter of a wire and the diameter of the rod to be designed to be the same or at least similar. The rod diameter is in a range of between 5 mm and 60 mm, for example. For example, the rod diameter is 20 mm, 25 mm, 30 mm, 35 mm, 40 mm, 45 mm, 50 mm, 55 mm or 60 mm. It is also conceivable for the diameters of two or more rods of the reinforcing body to differ. The winding wire diameter is between 1 mm and 20 mm, in particular, between 2 mm and 15 mm, for example. For example, the winding wire diameter is 4 mm, 5 mm, 6 mm, 7 mm, 8 mm, 9 mm, 10 mm, 11 mm, 12 mm, 13 mm, 14 mm or 15 mm. If the reinforcing body comprises a plurality of winding wires, it is conceivable for the winding wires to have the same diameter or to comprise different diameters.

The heart of the present invention may be regarded as the fact that the device has a binding unit, wherein the device is designed to automatically connect the positioned wires by way of a binding element at a binding point by means of the binding unit.

The device is designed as a reinforcement production machine, for example. For example, the reinforcement production machine is designed as a reinforcing body production machine, e.g. as a reinforcing cage production machine and/or as a reinforcing mat production machine. The device is designed as a cage binding machine, e.g. as a post reinforcing cage production machine or a pillar reinforcing cage production machine or as a pipe reinforcing cage production machine or as a reinforcing tube binding machine, for example. It is also conceivable for a reinforcing mat cage, e.g. a 3-dimensional reinforcing mat, to be produced by means of the proposed cage binding machine.

It is furthermore proposed that the device is designed so that the device aligns a cross wire and a longitudinal wire, in particular, of the reinforcement to be produced, at an angle to one another.

A cross wire and a longitudinal wire advantageously intersect at the binding point. However, it is also conceivable for cross wires or longitudinal wires to be connectable to one another at a binding point by the binding unit. It is conceivable, for example, for the cross wire or the longitudinal wire to be aligned parallel or at an angle, e.g. extending transversely, to one another, in particular, by means of the device, at the binding point. The device preferably arranges a cross wire and a longitudinal wire, in particular, of the reinforcement to be produced, at an angle greater than 0° to one another. A longitudinal axis of the cross wire and a longitudinal axis of the longitudinal wire are advantageously at an angle to one another.

Moreover, it proves advantageous that the binding element is designed as a bending wire and/or as a bending tie.

The binding element is advantageously designed as a wire, in particular, as a binding wire, e.g. as a tie wire. The binding wire advantageously has a diameter of between 0.5 mm and 1.5 mm, e.g. between 0.6 mm and 1.4 mm. The diameter of the binding wire is approximately 0.6 mm, 0.7 mm, 0.8 mm, 0.9 mm, 1.0 mm, 1.1 mm or 1.2 mm. The binding wire is formed from metal, for example. In particular, the binding element, e.g. the binding wire, is present in coated or sheathed form. The binding wire is galvanized, for example. The binding wire is formed from steel, in particular, in the form of a steel wire, for example. The steel wire is coated or galvanized, for example. For example, the binding element is of plastic-coated design, e.g. the binding element comprises a plastic sheath.

The binding element is in the form of a simple binding wire, for example. It is also conceivable for the binding element to be designed as a dual or multiple binding wire. The dual or multiple binding wire can have a plurality of wires, for example, which advantageously run parallel to one another. For example, the dual binding wire comprises two binding wires, in particular, identical binding wires, which are adjacent to one another along the longitudinal axes thereof. For example, the two wires of the dual binding wire are connected to one another along the longitudinal axes thereof. For example, the two wires of the dual binding wire are adhesively bonded and/or welded to one another, in particular, along the longitudinal axes thereof. The binding element, e.g. the binding wire, is in the form of a strand, for example.

The binding element is designed as a so-called double wire, for example, and, in particular, comprises precisely two wires. It is also conceivable for the binding element to be designed as a clip or clamp. For example, the binding element is in a clip-like or clamp-like form.

It is also advantageous that the positioning mechanisms have a positioning unit in order to position the binding unit, in particular, automatically. It is thereby possible to implement connection of the cross wires and longitudinal wires in a continuous production process for the reinforcing body, thereby advantageously shortening a production time for the reinforcement, e.g. a production time for the reinforcing body.

It likewise proves advantageous that parts of the binding unit, e.g. a binding head, are mounted in such a way as to be movable in all three spatial directions on the device, in particular on the stand. For example, the binding head is mounted on the device in such a way as to be movable in all three spatial directions, in particular, by the positioning mechanisms. It is also conceivable for the binding head to be mounted in such a way as to be movable in precisely two spatial directions. For example, the binding head is mounted on the device in such a way as to be linearly movable in each of precisely two spatial directions, e.g. by means of two linear axes.

It is conceivable, for example, for the binding head to be movable, in particular linearly movable, along two linear axes, which are transverse, in particular perpendicular, to one another. The binding head is advantageously mounted in such a way as to be movable, e.g. linearly movable, individually, in particular separately, in each spatial direction. For example, the binding head is arranged on the device in such a way as to be guided movably along a circular path, wherein the circular path has a midpoint which coincides, for example, with the central longitudinal axis of the device. It also proves advantageous that the binding head can be moved, in particular positioned, in such a way that the binding head can be aligned, e.g. positioned, along a slope of a winding wire of the reinforcing body. For example, the binding head is mounted in such a way as to be pivotable, e.g. rotatable, in a direction transverse, in particular perpendicular, to the central longitudinal axis of the device and/or a longitudinal extent of a longitudinal rod of the reinforcing body.

The positioning unit is in the form of a robot arm, for example. The robot arm is preferably designed to make a binding head of the binding unit follow a movement of a binding point, in particular, a movement of the winding wire and/or a movement of a longitudinal rod of the reinforcing body to be produced. The binding head of the binding unit is advantageously arranged at one end of the robot arm. A comparative maximum of freedom of motion of the binding head can thereby be achieved.

For example, the device comprises a control unit in order to perform closed-loop and/or open-loop control of joining processes, e.g. binding processes of the binding unit and/or movements of the binding unit, e.g. of the binding head. The control unit advantageously comprises, inter alia, a monitoring unit and a sensor element, e.g. for detecting a binding point of the reinforcing body.

Moreover, it proves advantageous that the device has a welding system, by means of which the longitudinal wire and the cross wire can be connected to one another, in particular additionally. It is thereby possible to produce bound reinforcements which can also be transported, in particular in a nonhazardous manner, without there being a risk, for example, that the reinforcement will fall apart or that individual wires will come loose, e.g. during movement by cranes.

The welding system is designed as a resistance welding system and/or as an inert gas welding system, for example. The inert gas welding system is advantageously designed as a metal/inert gas welding system (MIG welding system) and/or as a tungsten/inert gas welding system (TIG welding system). It is also conceivable for the inert gas welding system to be in the form of a plasma welding system.

The positioning mechanisms advantageously comprise a positioning unit, in particular a further positioning unit, in order, for example, to move, in particular to position, a welding head of the welding system.

In one advantageous embodiment of the present invention, the binding unit is designed in such a way that a binding element, e.g. a single binding element, can be wound around a cross wire and a longitudinal wire, in particular jointly, at the binding point.

For example, the binding unit is designed as a reinforcement binder, in particular an automatic reinforcement binder. The binding unit is advantageously designed as a device for connecting reinforcing wires and/or rods of a reinforcement, in particular automatically, e.g. releasably. The binding unit advantageously supplies the binding element and winds the cross wire and longitudinal wire with the binding element, for example, at the binding point. Here, the binding element can be part of a continuous wire. For example, the binding unit cuts a length of the binding element from a continuous wire and advantageously feeds the binding element to the binding point.

The binding unit is advantageously designed in such a way that the binding element, in particular the binding wire, can be wound around the cross wire and the longitudinal wire once or multiple times at the binding point. For example, the binding unit winds the binding element once, twice, three times or four times around the cross wire and the longitudinal wire at the binding point. It is also conceivable for the binding unit to be designed in such a way that a double wire can be wound once or twice around the cross wire and the longitudinal wire at the binding point.

The binding element loops around, fits around and/or encloses the cross wire and longitudinal wire, for example, at the binding point, e.g. in the manner of a coil, loop or ring.

An internal diameter of the binding element, in particular a maximum internal diameter, in the state in which it is arranged at the binding point, in particular an internal loop or coil diameter of the binding element, e.g. a maximum internal diameter, advantageously corresponds approximately to the sum of the diameters of the longitudinal wire and of the cross wire.

In the state of the binding element in which it is arranged at the binding point, ends of the binding element are twisted, braided and/or extend spirally around one another. The ends of the binding element advantageously project transversely to a longitudinal extent of the longitudinal wire and transversely to a longitudinal extent of the cross wire. A projecting length of the ends of the binding element, in particular a projecting total length of each end of the binding element, from the cross wire and/or longitudinal wire in the state in which it is arranged at the binding point is advantageously no longer than 14 mm, in particular, no longer than 12 mm. For example, the ends project by a length of between 5 mm and 14 mm, between 8 mm and 14 mm, between 5 mm and 12 mm, e.g. between 8 mm and 12 mm, from one of the wires. The ends of the binding element preferably project by no more than 14 mm from the longitudinal wire and/or from the cross wire, transversely, in particular perpendicularly, to a longitudinal extent of the longitudinal wire and/or transversely, in particular perpendicularly, to a longitudinal extent of the cross wire.

It is also conceivable for a length of one end of the binding element to be greater than 14 mm. In this case, it is conceivable that, after application by the binding unit, the ends are bent around by means of the binding unit, for example, with the result that a point on one end of the binding element which is furthest away projects by no more than 14 mm from the cross wire and/or from the longitudinal wire, transversely to a longitudinal extent of the cross wire and/or transversely to a longitudinal extent of the longitudinal wire.

Moreover, it is proposed that the binding unit is designed in such a way that a binding torque of the binding element at the binding point can be predetermined.

The binding element can advantageously be arranged at the binding point in such a way that the cross wire and the longitudinal wire rest against one another, e.g. are pressed against one another by the binding element, in particular when viewed transversely to the respective longitudinal extents thereof, in the state of the binding element in which it is arranged at the binding point. A binding torque or a binding force moment of the binding element on the cross wire and/or on the longitudinal wire at the binding point can advantageously be predetermined.

It also proves advantageous that the device is designed in such a way that the positioning unit adapts a movement of the binding unit to a movement of a longitudinal wire and/or of a cross wire in such a way that the binding unit remains stationary relative to the binding point during a binding process. For example, the positioning unit makes the binding unit follow a movement of the cross wire and/or of the longitudinal wire. A cycle time for the production of a reinforcement is thereby shortened, for example.

There are advantageously means of movement on the device. The positioning unit comprises the means of movement, for example. The means of movement are preferably designed in such a way as to make the binding unit follow a movement of a binding point on a reinforcement to be produced, in particular a movement of a longitudinal wire and/or cross wire of the reinforcement to be produced. For example, the means of movement are designed to make the binding head of the binding unit follow a movement of a position on the reinforcement which is to be processed, in particular, the binding point. The means of movement comprise a drive, for example, e.g. in the form of an electric motor. It is also conceivable for the means of movement to comprise a pneumatic and/or a hydraulic drive.

In one advantageous embodiment, the device, in particular the binding unit, has a driver member. For example, the binding unit rests by means of the driver member against a longitudinal wire and/or cross wire, with the result that a movement of the longitudinal wire and/or cross wire brings about a movement of the driver member and thus, for example, a movement of the binding head. Readjustment of the binding unit, in particular of the binding head, to a position of a binding point is thereby implemented in a relatively simple and reliable manner.

The longitudinal wire and/or cross wire advantageously move/s the driver member, e.g. together with the binding head, around the central longitudinal axis of the device. For example, the longitudinal wire and/or cross wire move/s the driver member, e.g. together with the binding head, on a circular path around the central longitudinal axis of the device. For example, the central longitudinal axis forms a midpoint of the circular path of the driver member while the driver member is being moved around the central longitudinal axis by the longitudinal wire and/or cross wire. For example, a movement, in particular a rotary movement, of the longitudinal wire and/or cross wire brings about a movement of the driver member. For example, the longitudinal wire moves the driver member, e.g. together with the binding head, in the direction of a feed direction of the longitudinal wire and/or cross wire along the central longitudinal axis of the device. As a result, the binding head is advantageously subject to a superposed motion, which is of spiral configuration, for example. For example, the binding head moves along a circular path, along a spiral or along an ellipse.

The driver member is preferably situated in a movable manner, in particular in a linearly movable manner, on the device, e.g. on the binding unit, in particular on the binding head. Coupling and/or decoupling of the driver member to/from the longitudinal wire and/or cross wire can thereby be implemented. For example, the driver member is movable by means of a drive unit. The drive unit is driven electrically, pneumatically and/or hydraulically, for example.

It is furthermore proposed that the device has two or more binding units. The cycle time for the production of the reinforcement is thereby advantageously reduced, e.g. approximately halved. The two or more binding units are advantageously of identical design. For example, the binding units, in particular the binding heads of the binding units, are arranged spaced apart from one another on the device, in particular on the stand of the device.

It likewise proves advantageous that the two or more binding units can be positioned independently of one another by the positioning mechanisms. The positioning mechanisms advantageously comprise a plurality of positioning units. For example, the binding units can be moved separately or jointly, e.g. synchronously, on the device by means of the positioning mechanisms. For example, each positioning unit moves and/or positions a binding unit, in particular a single binding unit.

In one advantageous embodiment, the device is designed in such a way that a binding direction of the binding element, at the binding point can be predetermined. The binding direction of the binding element is understood to mean a direction along which the binding element extends relative to a longitudinal axis and/or a longitudinal extent of the longitudinal wire and/or cross wire and/or relative to the central longitudinal axis of the device. For example, the binding direction of the binding element should be understood to mean an alignment of an axis of symmetry of a coil or loop of the binding element, in the state in which it is arranged at the binding point, relative to a longitudinal axis and/or a longitudinal extent of the longitudinal wire and/or cross wire. It is also conceivable that the binding element has two or more different binding directions in the state in which it is arranged at the binding point. The different binding directions advantageously extend transversely, in particular perpendicularly, to one another. For example, the binding element comprises two or more coils or loops at the binding point. For example, two or more coils or loops cross one another at the binding point. It is also conceivable that two or more coils or loops are at least approximately parallel to one another. For example, the coils or loops of the binding element or a plurality of, e.g. two, binding elements are spaced apart at the binding point over a transverse extent of the longitudinal wire and/or cross wire.

Furthermore, it proves advantageous that the device, in particular the binding unit, is configured in such a way that different binding elements can be used. The different binding elements differ in diameter and/or configuration, for example. A binding element is sheathed in one configuration and unsheathed in another configuration, for example. It is also conceivable that, in another or in an identical configuration, a binding element has a single core, two cores or multiple cores. It is conceivable that the binding unit is of convertible design, thus enabling the binding unit to be modified in such a way, between production of a first reinforcement and production of a second reinforcement, that a first binding element can be applied at a binding point of the first reinforcement by means of the binding unit to produce the first reinforcement, and a second binding element that differs from the first binding element can be applied at a binding point of the second reinforcement by means of the same binding unit to produce the second reinforcement.

Furthermore, it is advantageous that the device, in particular the binding unit, is configured in such a way that a plurality of, in particular different, binding elements can be used. It is conceivable, for example, for a binding unit to be present in such a way that the binding unit can simultaneously or successively apply different binding elements at the same binding point or that the binding unit can apply different binding elements at successive binding points. For example, the device comprises two or more binding units, and the at least two binding units are present in such a way that the two binding units can apply different binding elements at the same or at different binding points.

It is also proposed that the device, in particular the binding unit, is configured in such a way that different longitudinal wires and/or cross wires can be connected to one another. The different longitudinal wires and/or cross wires differ in their diameters or in their cross sections, in particular their external cross sections, for example. For example, a reinforcement to be produced comprises at least two or more different longitudinal wires. The device and, in particular, the binding unit are advantageously designed to recognize the dimensions of the longitudinal wire and/or cross wire at a binding point, in particular to detect said dimensions and adjust accordingly, e.g. to regulate a distance between the binding head of the binding unit and the binding point and/or to adapt a loop diameter and/or a binding element length accordingly.

In one advantageous configuration of the present invention, the device for producing a reinforcement is designed as a cage binding machine, in particular as a reinforcing cage binding machine and/or as a mat cage binding machine.

BRIEF DESCRIPTION OF THE DRAWINGS

Various illustrative embodiments are explained in greater detail with reference to the following schematic drawings, giving further details and advantages.

FIG. 3 shows a perspective view of a reel of a binding element;

FIG. 4 shows various binding elements in a partial view;

FIG. 5 shows a perspective view of a reinforcement with binding points, wherein a binding element with a different number of windings is arranged at each binding point;

DETAILED DESCRIPTION OF THE INVENTION

Figure 1:
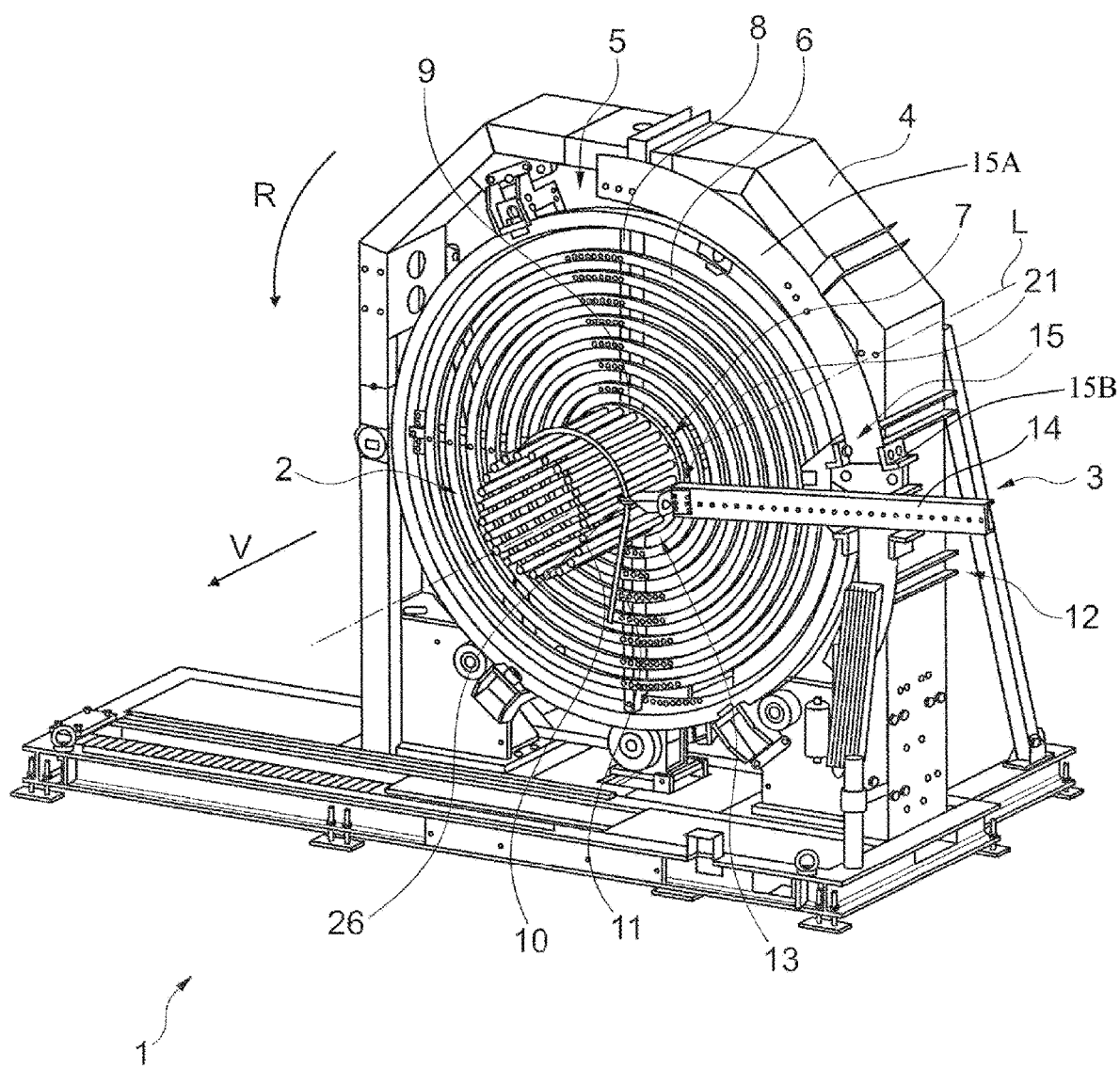
FIG. 1 shows a perspective partial view of a device according to the present invention obliquely from the front and from above.
Figure 2:
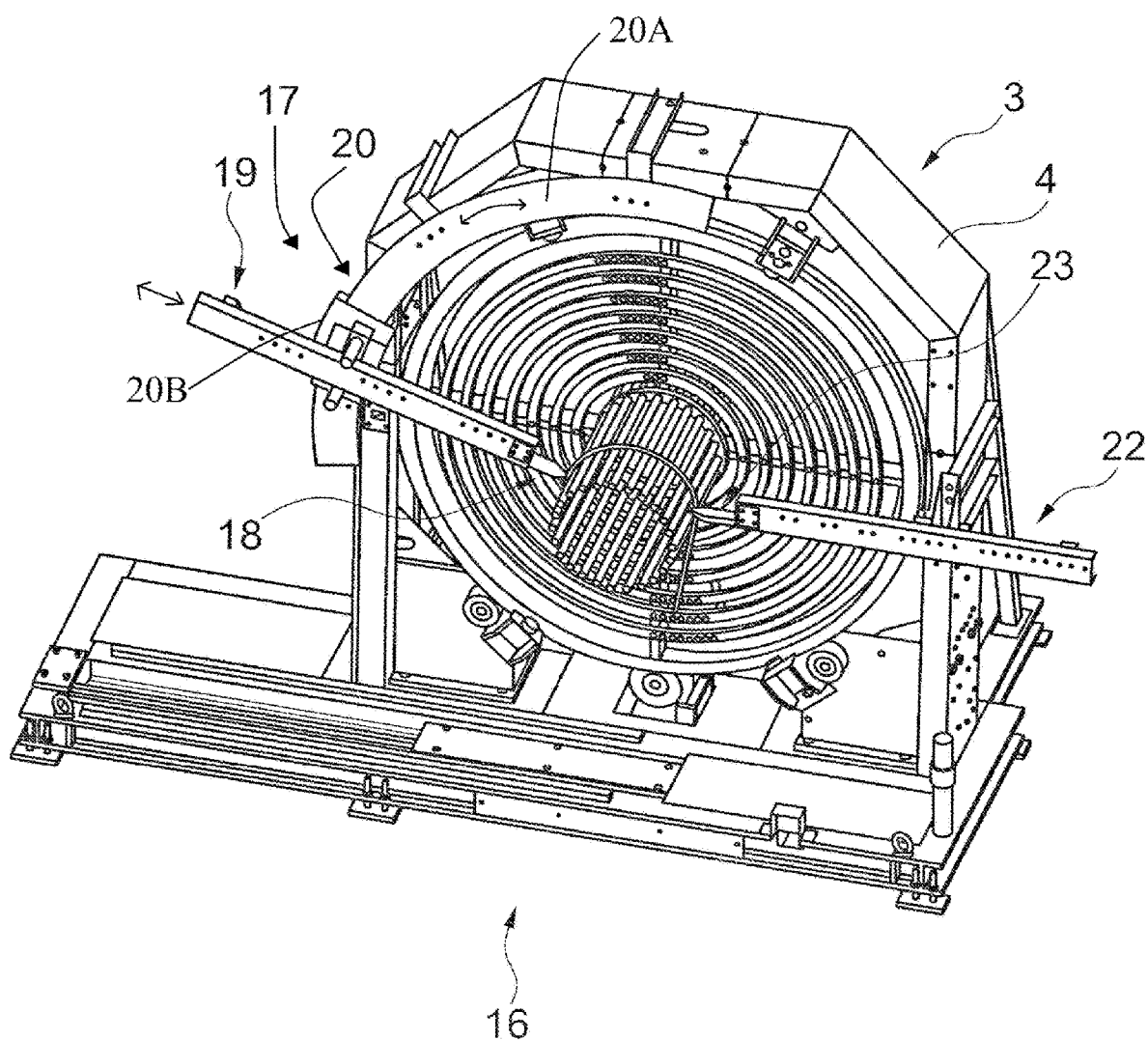
FIG. 2 shows a perspective partial view of another variant of the device obliquely from the front and from above.

A cage binding machine 1 according to the present invention for producing a reinforcing body in the form of a reinforcing cage 2 comprises a stand 3 (FIGS. 1, 2). The stand 3 comprises a frame 4 and a main wheel 5. The main wheel 5 is situated on the frame 4 in a manner which allows rotational movement, in particular, in a direction of rotation R. There are ring elements 6 on the main wheel 5, for example. The ring elements 6 are advantageously designed to have different diameters and are arranged on the main wheel 5 centrally with respect to a central midpoint or with respect to a central longitudinal axis L of the main wheel 5, of the frame 4 and/or of the stand 3. Actuating elements 7 are mounted along the ring elements 6 in such a way that they can be positioned, in particular moved, in the radial direction, perpendicularly to the longitudinal axis L. The actuating elements 7 are advantageously mounted so as to be movable in a plane of movement of the main wheel 5 and/or parallel to the plane of movement of the main wheel 5. It is also conceivable, for example, for the main wheel 5 to have spokes 8, along which an actuating element 7 is situated in such a way that it can be positioned, in particular moved, in the radial direction, perpendicularly to the longitudinal axis L (not shown). Arranged on the actuating element 7 there is furthermore a guide element 9, which is provided for the purpose of guiding a rod, in particular, a longitudinal wire 10 of the reinforcing cage 2, in particular, parallel to the longitudinal axis L. During a production process of the reinforcing cage 2, the main wheel 5 advantageously rotates clockwise, in particular, as viewed in the feed direction V.

A reinforcing cage 2 comprises a cross wire, e.g. in the form of a winding wire 11 and one or, in particular, more longitudinal wires 10. The winding wire 11 is arranged, advantageously in a spiral shape, around an outer circumference of the reinforcing cage 2 by means of the cage binding machine 1. The main wheel 5 is advantageously mounted on the frame 4 of the stand 3 of the cage binding machine 1 in such a way as to be rotatable in a plane of movement around the longitudinal axis L. Apart from the stand 3, the cage binding machine 1 advantageously comprises at least one further secondary stand (not illustrated), which is provided, for example, for the purpose of conveying the longitudinal wires 10 of the reinforcing cage 2 in a feed direction V, which is advantageously aligned parallel to the longitudinal axis L.

Furthermore, the cage binding machine 2 comprises a binding unit 12 having a binding head 13. The binding head 13 is advantageously capable of being positioned by means of positioning mechanisms in the form of a linear adjuster 14 in a radial direction transverse to the central longitudinal axis L of the main wheel 5. The binding head 13 is thereby mounted on the stand 3 in such a way that it can be moved backwards and forwards at a binding point 26 of the reinforcing cage 2. The linear adjuster 14 is furthermore arranged pivotably on the stand 3 by means of a pivoting arrangement 15, for example. The pivoting arrangement 15 includes an arc portion 15A and a carriage 15B. The carriage 15B moves along the arc portion 15A and carries the linear adjuster 14. The linear adjuster 14, and hence the binding head 13, can thereby advantageously be rotated together with the main wheel 5 around the central longitudinal axis. This enables the binding head 13 to be positioned relative to a binding point 26 of the reinforcing cage 2 during a binding process.

It is furthermore advantageous that the binding head 13 of the binding unit 12 has a rotation arrangement 21, by means of which the binding head 13 is mounted on the frame 4, in particular on the linear adjuster 14, in such a way as to be rotatable around an axis of rotation aligned transversely, in particular perpendicularly, to the central longitudinal axis and parallel to the plane of movement of the main wheel 5.

FIG. 2 shows another variant of a device for producing a reinforcement in the form of a further cage binding machine 16. In comparison with the cage binding machine 1 from FIG. 1, the cage binding machine 16 in FIG. 2 advantageously comprises an additional binding unit 17 and/or a welding unit 22, wherein the remaining components of the cage binding machine 16 are advantageously of identical design to cage binding machine 1.

The same reference signs are used below for the same components, in particular for the two cage binding machines 1 and 16. In the present case, for example, the same reference sign 25 is sometimes used for different binding elements 25 and/or binding points 26. For example, the additional binding unit 17 is arranged on the stand 3 in such a way that it can be moved independently of a first binding unit. A binding head 18 of the additional binding unit 17 is preferably mounted on the frame 4 of the cage binding machine 16 by way of a further linear adjuster 19 and a further pivoting arrangement 20, which, like pivoting arrangement 15, also includes an arc portion and a carriage 20B. Production of a reinforcement is thereby shortened in comparative terms. It is also conceivable, in particular on cage binding machine 16, that the binding unit 12 is designed as a welding unit 22.

The welding unit 22 has a welding head 23, for example, thus enabling a longitudinal wire 10 and the winding wire 11 to be connected to one another by the cage binding machine 16 by means of a welding method.

FIG. 3 shows a winding reel 24, on which a binding element 25 in the form of a continuous wire is wound. Binding elements 25 can have different diameters, and can be multi-stranded, coated and/or sheathed, as illustrated in FIG. 4. For example, different binding elements 25a, 25d, 25e can have the same diameter, but are coated differently, for example. For example, binding element 25a is plastic-coated, binding element 25d is galvanized, and binding element 25e is uncoated. It is also conceivable for binding elements 25a and 25b to have different diameters. Moreover, it is conceivable that a binding element 25c is of multi-core, e.g. two-core, design.

In FIG. 5, a binding element 25 is shown at each binding point 26, wherein the binding element 25 in each case surrounds a cross wire and a longitudinal wire 10, 11 at the binding point 26. The binding element 25 is wound twice around the cross wire and the longitudinal wire 10, (double winding) at binding point 26a, for example, three times (triple winding) at binding point 26b, for example, and four times (quadruple winding) at binding point 26c, for example. A further binding element 25 in the form of a two-core wire corresponding to binding element 25c from FIG. 4, which winds once around the cross wire and the longitudinal wire 10, 11 (single winding), is shown at binding point 26d.

Figure 6:
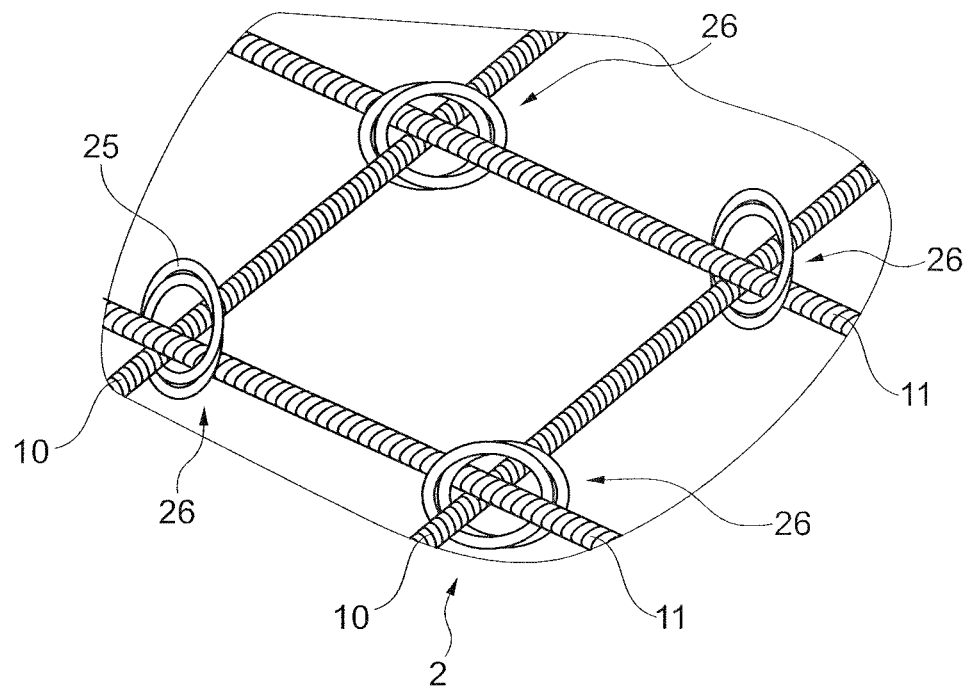
FIG. 6 shows a perspective view of a reinforcement with binding points, at each of which a binding element is arranged, wherein an alignment of the binding elements is different.

Two different coil alignment possibilities for a binding element 25 are illustrated at binding points 26 in FIG. 6. For example, a reinforcing cage 2, which has binding elements 25 aligned differently with respect to one another at binding points 26, is advantageously relatively stable and/or secure for transport.

Figure 7:
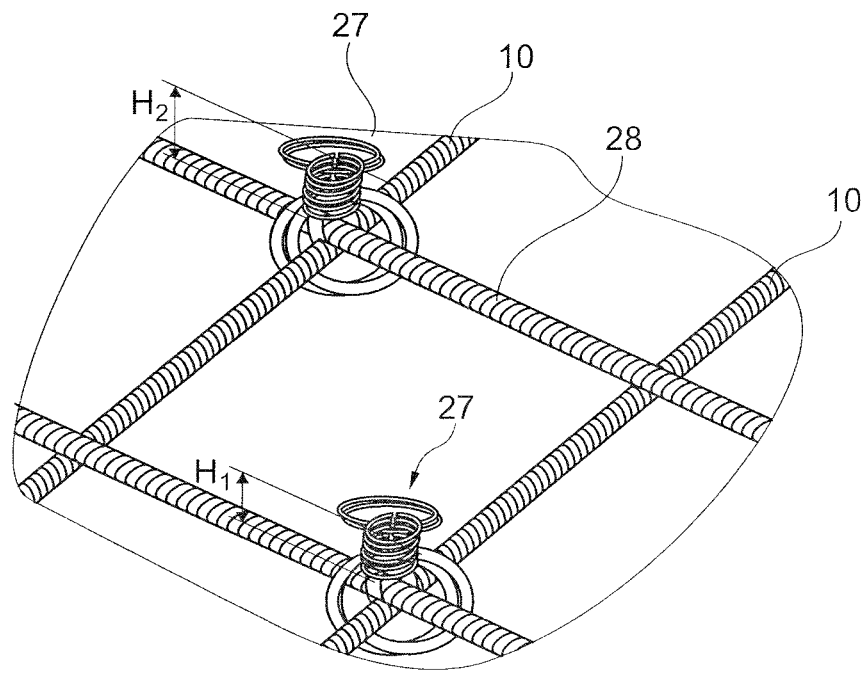
FIG. 7 shows a perspective view of a reinforcement with binding points, wherein ends of the binding elements project by different amounts at the binding points.

Binding elements 25 arranged at binding points 26 are shown in FIG. 7, wherein the binding elements 25 differ in the heights H1 and H2 of their ends 27. Here, the heights H1 and H2 extend transversely, in particular perpendicularly, to a longitudinal extent of the longitudinal wire 11 from an outer side 28 of a longitudinal wire 11 to the furthest point of the ends 27 from the outer side 28 of the longitudinal wire 11. The binding unit 12 of the cage binding machine is advantageously designed in such a way that ends 27 of a binding element 25 are relatively short and/or project relatively little from a longitudinal wire and/or cross wire 10, 11 in the state in which they are arranged at the binding point 26.

Figure 8:
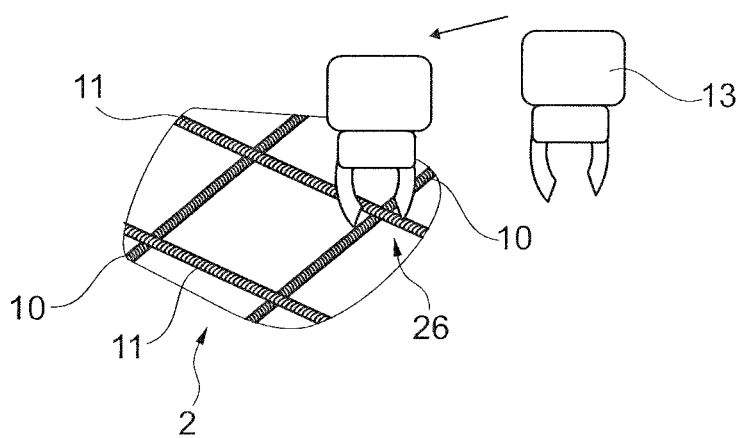
FIGS. 8 to 11 show a perspective view of a sequence of motion of a binding head for binding a binding point of a reinforcement with a binding element.
Figure 9:
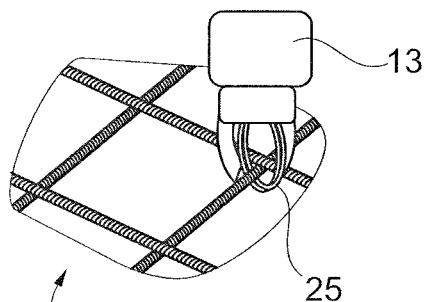
Figure 10:
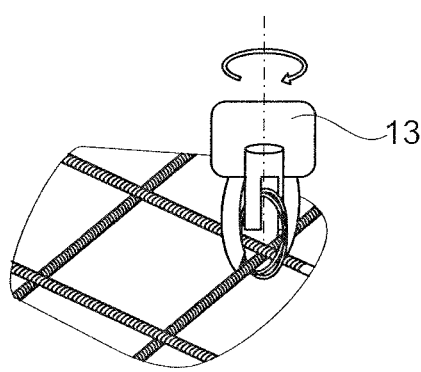
Figure 11:
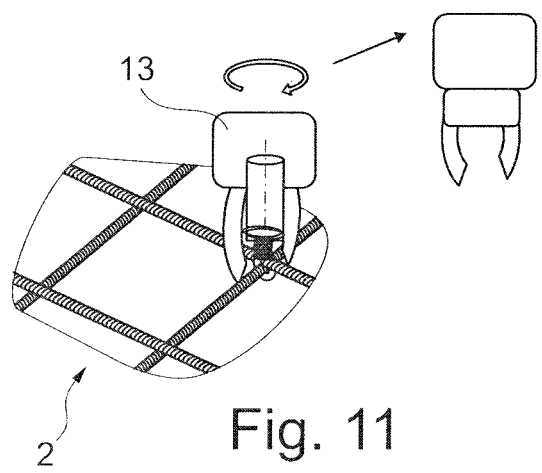

FIGS. 8 to 11 show a binding process of a binding element 25 at a binding point 26. First of all, the cage binding machine 1 positions a cross wire and a longitudinal wire 10, 11 relative to one another, such that the two wires 10, 11 cross and/or advantageously rest against one another at the binding point 26, for example. The cage binding machine 1 then moves the binding head 13 up to the binding point 26 (FIG. 8). Once the binding head 13 is positioned at the binding point 26, the binding process begins. For this purpose, the binding head 13 first of all winds the binding element 25 around the cross wire and the longitudinal wire 10, 11 (FIG. 9). The binding head 13 then twists ends of the binding element 25 together in a rotary motion, with the result that the windings of the binding element 25 draw together around the cross wire and the longitudinal wire 10, 11 at the binding point 26, and the binding element 25 exerts a binding force on the cross wire and the longitudinal wire 10, 11, with the result that the two wires 10, 11 are pressed against one another and fixed in their position relative to one another by the binding element 25 (FIG. 10). The binding head 13 is then moved away from the binding point 26 (FIG. 11), e.g. to another binding point 26, thus enabling the binding process to start again at the other binding point 26.

LIST OF REFERENCE SIGNS 1 cage binding machines
2 reinforcing cage
3 stand
4 frame
5 main wheel
6 ring element
7 actuating element
8 spoke
9 guide element
10 longitudinal wire
11 winding wire
12 binding unit
13 binding head
14 linear adjustment
15 pivoting arrangement
15A arc portion
15B carriage
16 cage binding machine
17 binding unit
18 binding head
19 linear adjustment
20 pivoting arrangement
20A arc portion
20B carriage
21 rotation arrangement
22 welding unit
23 welding head
24 winding reel
25 binding element
25a binding element
25b binding element
25c binding element
25d binding element
25e binding element
26 binding point
26a binding point
26b binding point
26c binding point
26d binding point
27 end
28 outer side

The invention claimed is:

1. A device for producing a reinforcement, comprising:
an automated positioning mechanism for positioning a longitudinal wire and a cross wire of the reinforcement; and
at least one binding unit comprising at least one binding element,
wherein the at least one binding unit of the device automatically connects the wires positioned by the automated positioning mechanism via the at least one binding element at a binding point,
wherein the automated positioning mechanism comprises a linear adjuster, and a positioning unit comprising a pivoting arrangement that positions the at least one binding unit,
wherein the positioning unit adapts a movement of the at least one binding unit to a movement of the longitudinal wire and/or the cross wire such that the at least one binding unit remains stationary relative to the binding point during a binding process, and
wherein during the production of the reinforcement, the device moves the longitudinal wires in a conveying direction along a central longitudinal axis and simultaneously around the central longitudinal axis.

2. The device as claimed in claim 1, wherein the automated positioning mechanism of the device aligns a cross wire and a longitudinal wire at an angle with respect to one another.

3. The device as claimed in claim 1, wherein the at least one binding element is at least one of a bending wire and a bending tie.

4. The device as claimed in claim 1, wherein the device further comprises a welding system that connects the longitudinal wire and the cross wire to one another.

5. The device as claimed in claim 1, wherein the at least one binding element of the at least one binding unit is wound around the cross wire and the longitudinal wire at the binding point.

6. The device as claimed in claim 1, wherein a binding torque of the at least one binding element of the at least one binding unit is predetermined.

7. The device as claimed in claim 1, wherein the at least one binding unit comprises two or more binding units.

8. The device as claimed in claim 7, wherein the two or more binding units are positioned independently of one another by the positioning mechanism.

9. The device as claimed in claim 1, wherein a binding direction of the at least one binding element at the binding point is predetermined.

10. The device as claimed in claim 1, wherein the at least one binding unit accommodates a plurality of the at least one binding element, which are different binding elements from one another.

11. The device as claimed in claim 1, wherein the at least one binding unit comprises a plurality of the at least one binding element.

12. The device as claimed in claim 1, wherein the at least one binding unit connects a plurality of different longitudinal wires and/or cross wires to one another.

13. The device for producing a reinforcement as claimed in claim 1, wherein the device is a cage binding machine.

14. The device for producing a reinforcement according to claim 13, wherein the cage binding machine is at least one of a reinforcing cage binding machine and a mat cage binding machine.

15. The device as claimed in claim 1, wherein the pivoting arrangement comprises an arc portion and a carriage that moves along the arc portion, and wherein the carriage carries the linear adjuster of the automated positioning mechanism.

16. The device as claimed in claim 15, wherein the arc portion of the pivoting arrangement is fixed to a frame of the device.

* * * * *